2,824,141

FLUOROETHERS

William A. Zisman, Washington, D. C., and Jacques G. O'Rear, Prince Georges County, Md., assignors to the United States of America as represented by the Secretary of the Navy No Drawing. Application January 6, 1954
Serial No. 402,607

2 Claims. (Cl. 260—615)

(Granted under Title 35, U. S. Code (1952), sec. 266)

This invention relates to new fluorinated organic compounds, more particularly to certain new fluoroethers.

The new fluoroethers of the invention are aliphatic or aromatic in character and have the general formula:

$$[H(CF_2)_n(CH_2)_x-O-]_mR$$

wherein R is a hydrocarbon or a chlorohydrocarbon radical, $m$ is the valence of R, $n$ is an integer from 2 to 20 and $x$ is an integer from 1 to 3. The new compounds are oils of wide liquidus range, low refractive index, low surface tension, high thermal stability and of boiling point comparable to that of the corresponding unfluorinated ethers. They are substantially non-flammable and non-corrosive and have applicability for use as solvents, dielectrics, lubricants and heat transfer agents.

The new fluoroethers may be prepared from polyfluoroalkanols of the general formula:

$$H(CF_2)_n(CH_2)_xOH$$

wherein $n$ and $m$ are as above by reacting the polyfluoroalkanol with aqueous alkali metal hydroxide, e. g., aqueous sodium hydroxide, and then with the corresponding p-toluene sulfonic acid ester. This method of preparing the ethers is described and claimed in copending application Serial No. 402,608, filed in the name of J. G. O'Rear on January 6, 1954.

The preparation of the new fluoroethers by the above method can be carried out in the following manner. The polyfluoroalkanol is dispersed at ordinary temperatures in an aqueous solution of the equivalent quantity of the alkali metal hydroxide. The suspension thereby formed is stirred and heated under reflux for about an hour to form the fluoroalcoholate. The equivalent reacting quantity of the desired p-toluene sulfonic acid ester (p-tosylate ester) is added to the cooled suspension of the fluoroalcoholate and the resulting mixture stirred under reflux heating for a substantial period to form the ether. Formation of the ether is indicated by the presence of an oily emulsion in the aqueous reaction mixture which on cooling is resolved into a heavy organic layer. This organic layer is washed by shaking the reaction mixture with from dilute to strong caustic soda solution. The strength of this solution will depend upon the p-toluene sulfonic acid ester to be broken up, care being taken in the case of certain of the product ethers not to cause removal of the chlorine from the chlorohydrocarbon group of the ether by the use of too strong alkali solution, as will be understood by those skilled in the art. The treated layer containing the product ether is then taken up in a suitable volatile organic solvent therefor, for example, ethyl ether or mixtures thereof with benzene or toluene. Unreacted polyfluoroalkanol may also be taken up in the volatile organic solvent. The extract is washed with water until neutral and distilled under reduced pressure to obtain the product ether. Where the boiling point of the product is close to that of the starting polyfluoroalkanol, the product may be further purified by repeated close fractional distillations at low pressures. Distillation of the extract will generally furnish from about 40 to 70% yields of the ethers of the herein-defined polyfluoroalkanols. For the preparation of monoethers there can be used, for example, such p-tosylates as, p-toluene sulfonic acid methyl ester, -ethyl ester, "propyl ester, -t-butyl ester, -2-ethylhexyl ester, -dodecyl ester, -octadecyl ester, -oleyl ester, -allyl ester, -cyclohexyl ester, -benzyl ester, -2-β-naphthylethyl ester, -phenyl ester, -β-naphthyl ester, -p-tolyl ester, -p-2-xylyl ester, -4-diphenyl ester, -p-benzylphenyl ester, -3-chloropropyl ester, -7-chloroheptyl ester, -4-chloro-n-amyl ester, -2,2,3-trichloro-n-butyl ester, -p-chlorophenyl ester, -3-chloro-4-diphenyl ester, etc., and for the preparation of the polyethers, p-toluene sulfonic acid polyesters derived from aliphatic and aromatic polyhydric alcohols, such as from ethylene glycol, propylene glycol, 2-chloro-1,3-propylene glycol, hexamethylene glycol, glycerol, pentaerythritol, resorcinol, di-tert-amyl resorcinol, 4-chlororesorcinol, 3,5,3',5'-tetramethyl-4,4'-dihydroxydiphenyl, p,p'-dihydroxydiphenyl, p,p'-dihydroxystilbene, 2,7-dihydroxynaphthalene, etc.

The polyfluoroalkanols used in the preparation of the new fluoroethers may be designated ω-hydroperfluoroalkylcarbinols and include, for example, ω-hydroperfluoroethylcarbinol, ω-hydroperfluorobutylcarbinol, ω-hydroperfluorohexylcarbinol, ω-hydroperfluorooctylcarbinol, ω-hydroperfluorodecylcarbinol, ω-hydroperfluorododecylcarbinol, etc. Other polyfluoroalkanols coming within the above general formula for the starting fluoroalcohols for the preparation of the fluoroethers are, for example, octafluorohexanol-1 of the formula, $H(CF_2)_4CH_2CH_2OH$, and tetrafluoropentanol-1 of the formula, $$H(CF_2)_2CH_2CH_2CH_2OH$$

Exemplative of the new fluoroethers which may be derived from the polyfluoroalkanols as defined above are 1H,1H,4H-perfluorobutoxypentane, 1H,1H,5H-perfluoropentoxyisooctane, 1H,1H,7H-perfluoroheptoxymethane, 1,6-bis(1H,1H,7H-perfluoroheptoxy)hexane, 1H,1H,4H-perfluorobutoxycyclohexane, 1H,1H,5H-perfluoropentoxybenzene and 1H,1H,5H-perfluoropentoxy-p-chlorobenzene, etc.

Among the new compounds of the invention are those fluoroethers which possess balanced oleophobic and oleophilic groups in the molecule such that one end of the molecule is soluble in hydrophobic liquid organic media, such as liquid hydrocarbons, liquid chlorinated hydrocarbons, liquid organic thioesters, liquid organic phosphate esters, liquid organic oxygenated compounds of the type of ether oils, such as polyoxyalkylene oils, chain stoppered or not by terminal alkyl groups, and carboxylic ester oils, such as the diester oils which have lubricating properties and are alkyl diesters of aliphatic carboxylic acids, more especially the branched chain alkyl diesters thereof. The fluorocarbon end of the molecule is essentially insoluble in such media. The fluoroethers which have this balance in the molecule between oleophobic and oleophilic portion have the remarkable property of being surface-active agents effective to decrease the surface tension of hydrophobic organic liquids, to decrease the rate of oxidation and the flammability of oils and the emulsifying and foaming tendency thereof. They are also capable of raising the autogenous ignition temperature of oils to a remarkable degree, in some instances as much as 350° F. above the normal for the oil.

The oleophobic portion of the molecule of the new surface-active ethers is constituted by the fluorohydrocarbon group which is characterized by the presence of a plurality of recurring divalent-$CF_2$-groups. By oleophobic is meant herein insolubility in or aversion to oils or other hydrophobic liquid organic media, or practically so. The oleophilic portion of the molecule of the new surface-active ethers is constituted by the hydrocarbon or chlorohydrocarbon group. By oleophilic is meant herein pronounced solubility in or affinity for oils or other hydrophobic liquid organic media. The solubility of the oleophilic portion of the fluoroether molecule in oils or other hydrophobic liquid organic media is determined mainly by the character of the hydrocarbon or chlorohydrocarbon group attached to the linking ether oxygen atom or atoms of the molecule. By varying the length of the chain of the aliphatic hydrocarbon group or by selection in respect to the aromatic hydrocarbon group attached to the ether oxygen atom or atoms, or by a combination of the same, the solubility of the oleophilic portion of the fluoroether molecule in hydrophobic liquid organic media can be modified. The oleophobic character of the hydrocarbon group attached to the ether oxygen atom or atoms of the fluoroether molecule can be enhanced by the presence of one or more chlorine atoms thereon provided the number of such chlorine atoms represents less than complete chlorination for the hydrocarbon group.

The surface-active fluoroethers represent a new class of amphipathic compounds which have the property of adsorbing at the organic liquid-air interface in such a manner that the surface is in substantial measure made up of fluorinated carbon atoms. For example, a surface-active fluoromonoether will adsorb at the oil-air interface with the polyfluorocarbon end of the monoether molecule located in the oil-air interface and the hydrocarbon or chlorinated hydrocarbon end thereof buried in the oil. This orientation of the fluoromonoether molecule in respect to the oil and oil-air interface finds proof in a considerable decrease in the surface tension of the oil. The principle of operation of these surface-active compounds is the same whether they are mono- or polyethers. The diethers will provide a U-shaped configuration in respect to the oil with the fluorocarbon portion of the molecule located in the oil-air interface to form the legs of the U and the hydrocarbon or chlorohydrocarbon portion located in the oil to form the bottom of the U. The triethers and tetraethers will behave in similar fashion to give three and four prong configurations in the oil-air interface with each prong being a fluorinated hydrocarbon chain.

An amphipathic compound is one which contains one or more groups which have an affinity for one medium and one or more groups which are antipathic to that medium but have an affinity for a different medium. Ref. G. S. Hartley, Paraffin Chain Salts, Hermann and Cie, Paris (1936); Moillet and Collie, Surface Activity, Van Nostrand, New York (1951). The surface-active fluoroethers have one group in the molecule which is attracted to hydrocarbons but is antipathic to fluorocarbons and another group which is attracted to fluorocarbons but is antipathic to hydrocarbons.

The invention is further illustrated by the following specific examples of the preparation of a fluoromonoether and fluorodiether, respectively. Parts are by weight unless otherwise noted.

*Example 1*

A suspension was formed by stirring together in the cold, 53.14 parts (.16 mol) of ω-hydro-perfluorohexylcarbinol, 9.2 parts of sodium hydroxide and 250 ml. of water. 27.94 parts (.15 mol) of methyl-p-toluene sulfonate was gradually added to the suspension with stirring, the addition being made over a period of 30 minutes. The mixture was then stirred under reflux for 16 hours. After cooling, the oily layer which formed in the reaction mixture was washed therein by shaking with an amount of 6 normal aqueous sodium hydroxide solution sufficient to hydrolyze the unreacted p-tosylate ester. The treated oily layer was then taken up in 400 ml. of an equal volume mixture of ethyl ether and benzene. The extract distilled under reduced pressure gave a substantial yield of the mono ether, 1H,1H,7H-perfluoroheptoxymethane of the formula

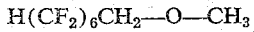

in dry condition. Repeated close fractional distillations of the product gives 40–50 percent yields of the mono ether. Purified in this way, the mono ether had a boiling point of 81–82° C. at 20 mm. and 118.5° C. at 203 mm., an index of refraction $N_D^{20}$ of 1.3614 and a density $D_4^{20}$ of 1.6323. The viscosity of the mono ether at 100° F. was 2.5 centistokes and that of the starting polyfluoroalcohol 8.04 centistokes.

*Example 2*

A mixture of 464.9 parts (1.4 mols) of ω-hydro-perfluorohexylcarbinol, 57.7 parts (1.4 mols) of sodium hydroxide and 300 ml. of water was first stirred in the cold and then for one hour under reflux. The resulting suspension was cooled and to it was gradually added under stirring, a total of 290 parts (.68 mol) of hexamethylene glycol-1,6-bis(p-toluene sulfonate) in 200 ml. of water. This mixture was stirred in the cold for an hour and then for 16 hours under reflux. On cooling, an oily layer formed at the bottom of the reaction mixture. The oily layer was shaken in the reaction mixture with 200 ml. of 6 normal aqueous sodium hydroxide and then extracted with repeated applications of ethyl ether. The extract was washed with water until neutral and then distilled under reduced pressure to remove the water. The product is the mixed diether, 1,6-bis(1H,1H,7H-perfluoroheptoxy) hexane of the formula

and is obtained in yields of 40 to 70 percent. The mixed ether boils at 142° C./0.3 mm., has an index of refraction $N_D^{20}$ of 1.316 and a density $D_4^{20}$ of 1.5776.

In the manner of the foregoing examples, the various other aliphatic and aromatic ethers as defined above can be prepared by the method described herein by employing the p-toluene sulfonic acid mono- or polyesters of the corresponding aliphatic, chloroaliphatic, aromatic and chloroaromatic alcohols, phenols and chlorophenols.

The invention described herein may be manufactured and used by or for the Government of the United States of America for governmental purposes without the payment of any royalties thereon or therefor.

What we claim is:

1. Fluoroethers of the general formula:

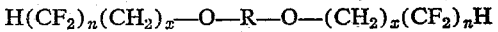

wherein R is an alkylene radical, $n$ is an integer from 2 to 20 and $x$ is an integer from 1 to 3.

2. The fluorodiether, 1,6-bis(1H,1H,7H - perfluoroheptoxy)hexane.

References Cited in the file of this patent
UNITED STATES PATENTS 2,433,844   Hanford _____ Jan. 6, 1948

OTHER REFERENCES

Henne et al.: J. Amer. Chem. Soc. (1950), vol. 72, pp. 4378, 4379, 4380.